UNITED STATES PATENT OFFICE.

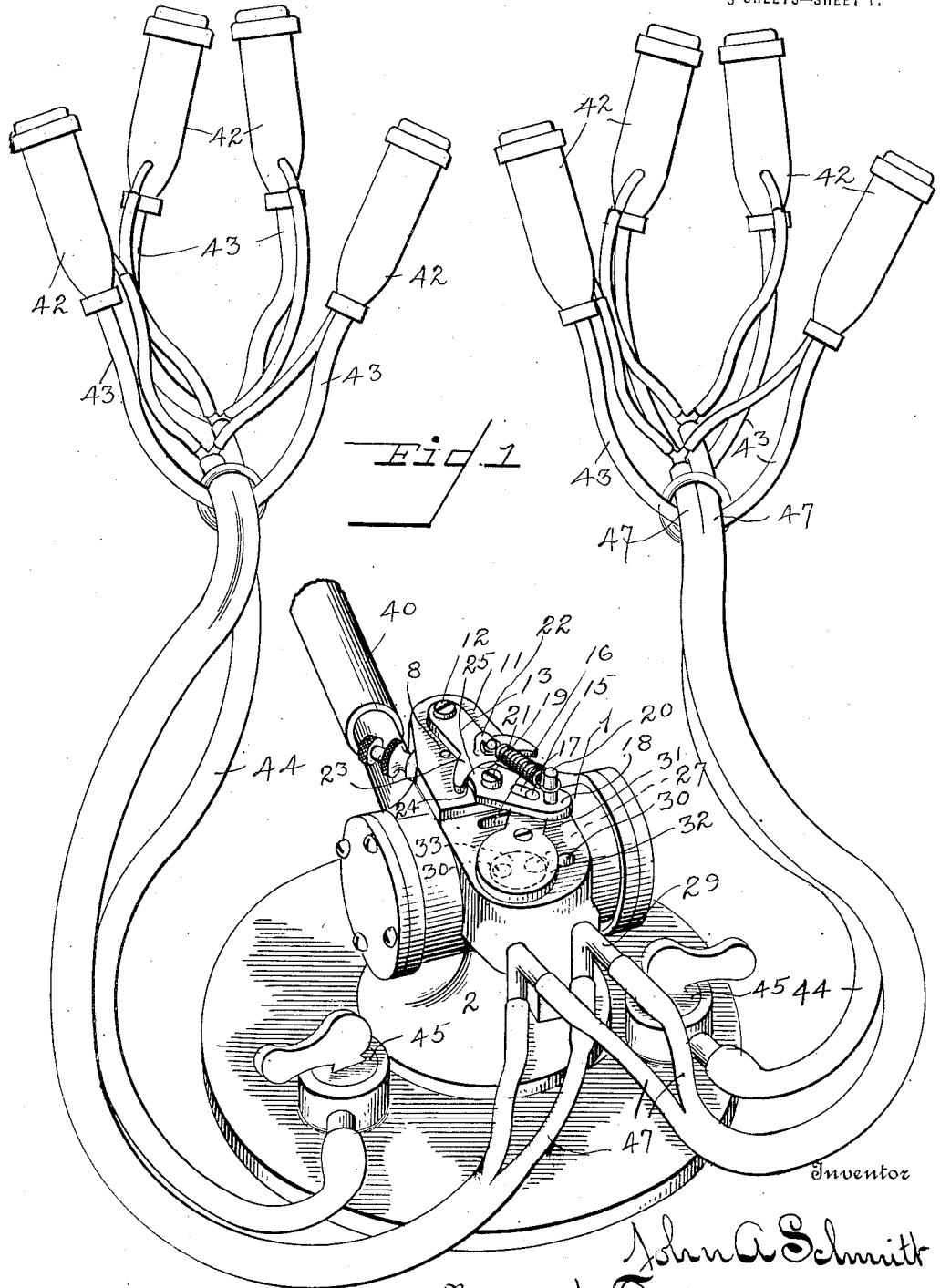

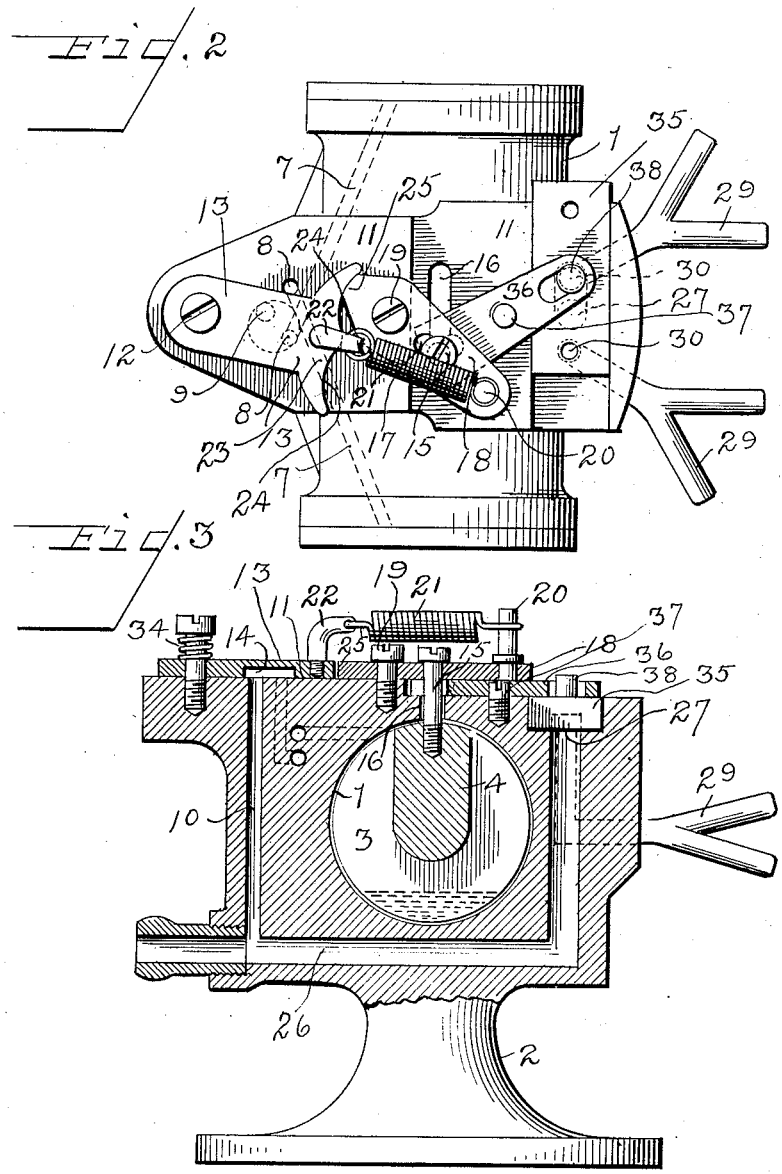

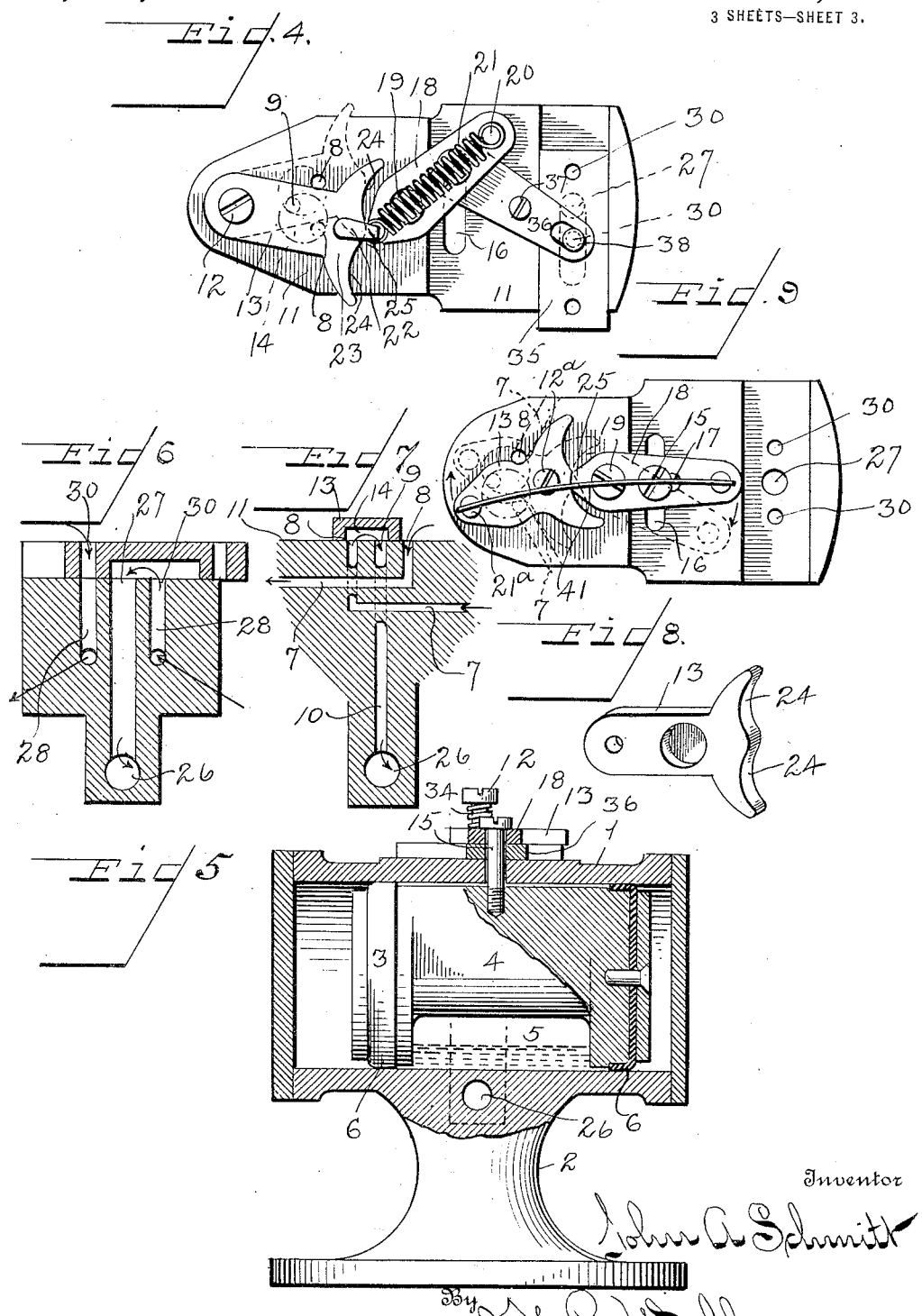

JOHN A. SCHMITT, OF COLUMBUS, OHIO, ASSIGNOR TO THE UNIVERSAL MILKING MACHINE COMPANY, A CORPORATION OF OHIO.

PULSATOR FOR MILKING APPARATUS.

1,408,036. Specification of Letters Patent. Patented Feb. 28, 1922.

Application filed January 23, 1919. Serial No. 272,684.

*To all whom it may concern:*

Be it known that I, JOHN A. SCHMITT, a citizen of the United States, residing at Columbus, in the county of Franklin and State of Ohio, have invented certain new and useful Improvements in Pulsators for Milking Apparatus, of which the following is a specification.

My invention relates to milking apparatus and more particularly to a pulsator therefor. While the pulsator forming the subject matter hereof has been shown in conjunction with teat cups of the inflation or pulsation type operated by the intermittent variation of air pressure therein, it is to be understood that the pulsator is not limited to such association, but may be used in any application where an alternation of air pressure or the intermittent effect of suction or exhaustion is to be desired.

The object of the invention is to simplify the structure as well as the means and mode of operation of such devices, whereby they will not only be cheapened in construction, but will be more efficient in use, automatic in operation, economical in manufacture and unlikely to get out of repair.

A further object of the invention is to provide a pulsator which will be automatically operated by variation of air pressure controlled by the action of the pulsator, and more particularly to provide an improved form of alternator or valve shifting and control means. The alternating mechanism herein shown is especially adapted to prevent the operation of the control valve until the pulsator piston has reached the limit of its stroke, and thereupon effect the immediate and instantaneous reversal of the valve.

A further object of the invention is to provide a construction employing a minimum number of parts in which a single element serves the double purpose of alternately tensioning the valve spring to actuate the valve successively in opposite directions, and at the same time to lock the valve member against movement until the limit of the piston stroke has been reached.

With the above primary and other incidental objects in view, as will more fully appear in the specification, the invention consists of the features of construction, the parts and combination thereof, and the mode of operation or their equivalents, as hereinafter described and set forth in the claims.

Referring to the drawings, Fig. 1 is a perspective view of the pulsator forming the subject matter hereof, mounted upon the lid or cover of the milk pail or receiver. Fig. 2 is a top plan view of the pulsator with a modified form of pulsator valve, the several operating parts being shown at the limit of their movement. Fig. 3 is a transverse sectional view. Fig. 4 is a top plan view of the pulsator showing the tumbler mechanism at the moment of the reversal of the control valve, the positions of the parts after reversal being shown by dotted lines. Fig. 5 is a longitudinal sectional view. Figs. 6 and 7 are detail views of the pulsator valve and control valve connections, respectively. Fig. 8 is a perspective view of the control valve. Fig. 9 is a modification.

Like parts are indicated by similar characters of reference throughout the several views.

In constructing the device there is employed a cylinder 1 mounted upon a suitable standard or base 2. The top of the cylinder is extended and shaped to accommodate the alternating valve mechanism or tumbler mechanism hereafter described. Located within the cylinder 1, is a reciprocatory piston 3, comprising two oppositely disposed heads interconnected by a web or tie portion 4 of reduced dimensions, whereby there is formed intermediate the piston heads, a chamber 5, for lubricant. Each piston head embodies a leather cap or packing member 6, which is of slightly greater diameter than the main piston head. The piston will thus be supported within the cylinder wholly upon such packing member, and all wearing or rubbing of metal to metal as the piston reciprocates, is eliminated. It will be obvious that other forms of packing or packing of other suitable material may be employed.

The provision for a supply of lubricant intermediate the piston heads insures adequate lubrication, ease of operation and longevity of the parts. The piston is actuated to and fro by air pressure directed to one end or the other by the alternation of a control valve. The preponderance of air pressure necessary to the movement of the piston may be effected either by the exhaustion of air from one end of the cylinder and the admission of air at atmospheric pressure to the opposite end of the cylinder, or it may be effected by air under pressure.

The air is supplied to the cylinder 1 and exhausted therefrom through two ducts, or conduits 7, leading from the opposite ends of the cylinder beyond the heads of the piston to orifices or ports 8, in the top or deck of the pulsator. The ports 8, and the related ducts 7 leading thereto, are alternately opened to atmosphere, and connected with a suction or exhaust port 9, pertaining to an exhaust duct 10, by the movement of the control valve hereafter described. The top or deck 11 of the pulsator is a smooth flat surface, in which the ports 8 and 9 are located. Pivoted at 12, and oscillating to and fro in contact with the flat surface 11, is a control valve member 13. This valve member 13 has therein a recess or pocket 14, which when the valve member is in one position registers with the port 9 and port 8 communicating with the duct 7, leading to one end of the cylinder, and when in the opposite position registers with the same port 9 and the opposite port 8, communicating with the opposite duct 7, leading to the opposite end of the cylinder. The relation of the recess or pocket 14 with the respective ports, is shown by dotted lines in Figs. 2 and 4. The reversal or oscillation of the valve member 13 thus alternately connects the suction port 9 with each of the ports 8, communicating through the ducts 7, with opposite ends of the cylinder, thereby exhausting air from the connected end of the cylinder, while at the same time opens the opposite port 8 to atmosphere, whereby air at atmospheric pressure is admitted through the exposed port 8, and corresponding duct 7, to the corresponding end of the cylinder.

This air pressure actuates the piston within the cylinder, thereby operating the tumbler mechanism to effect the reversal of the control valve, whereupon the opposite port 8 is exposed, admitting air at atmospheric pressure to the corresponding end of the cylinder, while the opposite end of the cylinder is exhausted through the interconnection of the port 8 with the exhaust port 9. To effect this reversal of the valve 13, there is provided a stud 15, engaged with the medial portion 4 of the piston and projecting through a slot 16, in the top or deck of the pulsator. The stud 15, engages in a slot 17 in a pivoted operating lever 18. The operating lever 18 is pivoted at 19, and is oscillated to and fro with the reciprocatory movement of the piston. The operating lever 18 carries at its free end a stud or pin 20, interconnected by a spring 21 with a stud 22, carried by the valve member 13. The construction is such that as the operating lever 18 approaches the limit of its stroke in either direction, the helical spring 21 is placed under tension, thereby tending to oscillate the valve member 13 to its alternate or reverse position. However, means are provided for preventing the movement of the valve 13, until the operating lever 18, and the actuating piston connected thereto, have reached the limit of their stroke. To this end the valve 13 is formed with a head 23, having on the margin thereof two intersecting arcuate faces 24. These faces 24 are so located and proportioned that they are brought to a position concentric with the pivotal point 19, of the operating lever 18, by the movement of the valve member 13 to its alternate positions. That is to say that when the valve member 13 is at one limit of its stroke, one of said arcuate faces 24 is concentric with the center 19, and when the valve member 13 is shifted to the opposite limit of its stroke, the other arcuate face 24 is brought to a position concentric with the same center 19. For convenience of manufacture, and to avoid undue wear, the intersecting point between the faces 24 is somewhat dulled or rounded. The operating lever 18 is provided with a nose 25 which engages the arcuate face 24 of the valve member, which is brought to concentric position with the center 19 by the shifting of the valve. As the operating lever 18 oscillates to and fro, its nose 25 sweeps the face 24, with which it has a wiping engagement. As the operating lever 18 approaches the dead center position where the spring 21 is being placed under tension, the nose 25 of the lever, approaches the inner end of the curved face 24 and forms a stop, securely locking the valve member 13 against oscillatory movement, until the operating lever 18 reaches the limit of its stroke and the spring 21 is fully tensioned.

At this moment the nose 25 of the operating lever passes beyond the intersecting angle or point, intermediate the arcuate faces 24 as shown in Fig. 4, whereupon the valve 13 is free to move about its pivotal connection 12, under the influence of the spring 21. This movement, of course, brings the opposite face 24 into position to be engaged by the nose 25 of the operating lever, which immediately begins its return oscillation, locking the valve 13 against the return movement, until the locking nose 25, has passed beyond the intersection of the curved faces 24. It will thus be seen that the operating lever 18 possesses the double function of tensioning the spring 21, to actuate the valve member 13, and of locking the said valve member 13 until the spring is fully tensioned and the operative parts have reached the limit of their strokes. Inasmuch as the valve member 13 and the operating lever 18 always tend to move to opposite positions, that is positions having opposite angularity in relation with each other, it is necessary to cross the ducts 7, whereby the right hand port 8 is connected with the left hand end of the cylinder 1 and the left hand port 8 is connected to the right hand end of the cylinder.

The operation of the control valve member 13 as hereinbefore described, is entirely independent of the operation of the pulsator valve hereafter referred to, although both valves are actuated by the piston, through the medium of the stud 15.

The suction or vacuum duct 10, leading downward from the port 9, and alternately connected with the respective ports 8 by the shifting of the control valve 13, is a branch duct leading from the main vacuum conduit 26 which extends beneath the cylinder 1, and upward at the opposite side of the cylinder to a port 27, in the top or deck of the pulsator. Located in the top or deck of the pulsator, at opposite ends of the port 27, are two ports 30 communicating through independent ducts 28, with Y connections 29, to which the pulsation tubes leading from the teat cups are attached. The ports 30, and communicating conduits are alternately interconnected with the exhaust or suction port 27, by the shifting of the pulsator valve. Referring to Fig. 1, the pulsator valve has been shown as a pivoted lever operated to and fro about its pivotal connection 31, by the interengagement of the stud 15, in a slot or opening in the free end thereof, while the opposite end of the operating pulsator valve member is formed with a spatulation 32, having therein a recess or pocket 33, indicated by dotted lines in Fig. 1, which registers with, and forms an intercommunicating means between the suction port 27 and one or the other of the ports 30. This pulsator valve is pivoted quite freely upon the stud 31. It is held in operative engagement with the top or deck 11, which constitutes the valve seat, by air pressure, whereby the interconnected ports 27 and 30 are hermetically sealed. Inasmuch as the pulsator valve member extends beneath the operating lever 18 into engagement with the common actuating stud 15, the top or deck of the pulsator has been formed with a step or offset 33ª whereby the pulsator valve oscillates in a plane parallel with, but below that of the operating lever 18.

The control valve 13 is likewise held in operative engagement with its seat upon the top or the deck of the pulsator by atmospheric pressure, thereby hermetically sealing the interconnection of the ports 9 and 8. However to insure a perfect seating contact of the control valve 13 and to obviate any tipping or unseating tendency under the influence of the spring 21, a helical spring 34 is coiled about the pivotal stud 12 of the valve 13, and tends to hold the valve member firmly upon its seat.

The construction and operation of the pulsator valve member is such that when the piston is at one limit of its stroke, the port 27 is connected through the recess 33 with one of the ports 30, and upon the reversal of the parts the suction port 27 is connected with the other port 30, while the opposite port 30 is exposed to atmosphere. There is thus effected an exhaustion and admission of air from and to the teat cups connected with the respective Y connections 29.

In lieu of this construction, a separate valve element 35 may be provided as shown in Figs. 2 and 4, adapted to reciprocate in a straight path of travel in a corresponding groove or recess formed in the top or deck of the pulsator. This slide valve 35 is actuated to and fro by an oscillatory lever 36, pivoted at 37, and having a slotted engagement at one end with the stud 15, carried by the piston and a slotted engagement at its opposite end with a stud 38, carried by the slide valve 35. The slide valve 35 is provided with a recess or pocket in its under surface corresponding to the recess or pocket 33, before mentioned, which serves to alternately connect the port 27 with the respective ports 30, as the slide valve 35 is shifted to and fro. The main suction or vacuum conduit 26 of the pulsator is connected with the main vacuum line 40.

The vacuum line 40 is provided with a terminal fitting detachably engaged with a check valve housing located upon the receiver lid or cover and communicating with the interior of said receiver or pail. These connections being no part of the present invention have not been shown in the drawing and will not be described in detail.

In Fig. 9 there has been shown a modification of the control valve actuating means in which a flat spring 41 is substituted for the helical retracting spring 21. In this form of construction the valve member 13 is pivoted near its inner end as at 12ª, while the opposite or outer end of the valve member carries a stud 21ª. The flat blade spring 41 is connected at one end to the stud 20, carried by the operating lever 18, and at its opposite end to the stud 21, carried by the valve member. The operation of the operating lever 18 places the flat spring under tension, whereby it shifts the valve when the latter is released by the nose 25 of the operating lever, as before described. There is this difference, however, that in this construction the ducts 7 are not crossed as shown in Fig. 2, but the right hand duct leads to the right hand end of the cylinder and the left hand duct leads to the left hand end of the cylinder.

In Fig. 1 there are shown two sets or groups of teat cups 42. These cups are of the inflation or pulsation type. All of the cups of each group are connected through the branch conduits 43 and a common milk conduit 44, with the inlet cut-off valve 45, located on the receiver or pail lid and communicating with the interior of the pail. For pulsation purposes, however, each group of teat cups is subdivided into two series, each provided with a separate passage through the pulsation tube 47. The pulsation tubes 47 are shown in the drawing as duplex tubes although it is obvious that independent pieces of tubing may be employed. The pulsation passages of each duplex tube of each group or cluster of teat cups do not lead to the same connection 29, but one passage from each group leads to each of the connections 29. Thus one subdivision of the group of teat cups is exhausted while air is admitted to the other subdivision of the same group. The cups comprising each subdivision of a single group or cluster being thus inflated and exhausted alternately. The second group of teat cups is similarly connected whereby portions of both groups are operated in unison.

The operation is as follows:— The conduit leading to the pulsator being exhausted, serves to exhaust the air from the receiver or pail, and through the conduit 26 to the port 27, thence beneath the pulsator valve from the port 30 and conduit 28, the Y connection 29 and the connecting passages through the pulsation tubes, from the pulsation chambers of the interconnected teat cups. This simultaneously affects one-half of the teat cups of each group or cluster. At the same time the opposite port 30 is open to atmosphere, thereby admitting air at atmospheric pressure through the port 30, passage 28, Y connection 29 and the interconnecting passages of the duplex pulsation tubes to the remaining half of the teat cups of both groups. At the same time the exhaustion of air or vacuum effected through the branch conduit 10, and beneath the control valve 13, through the port 8 and duct 7, exhausts air from one end of the cylinder 1. The opposite port 8 and duct 7 are at the same moment open to atmosphere, thereby admitting air to the opposite end of the cylinder, which reciprocates the piston toward the exhausted end of the cylinder carrying with it the valve operating members.

From the above description is will be apparent that there is thus provided a device of the character described possessing the particular features of advantage before enumerated as desirable, but which obviously is susceptible of modication in its form, proportion, detail construction or arrangement of parts, without departing from the principle involved or sacrificing any of its advantages.

While in order to comply with the statutes, the invention has been described in language more or less specific as to certain structural features, it is to be understood that the invention is not limited to the specific details shown, but that the means and construction herein described and shown comprise but one of several modes of putting the invention into effect, and the invention is therefore claimed in any of its forms or modifications within the legitimate and valid scope of the appended claims.

Having thus described my invention I claim:

1. The combination with a fluid pressure operated pulsator mechanism, of a movable control valve governing the action of the fluid pressure upon said mechanism, a pivoted operating member oscillated to and fro by the action of said mechanism, two arcuate faces upon said valve member alternately moved into positions concentric with the pivotal point of the operating member by the movement of said valve to its alternate positions, one end of the operating member having a wiping engagement with the concentrically positioned arcuate face and adapted by its engagement therewith to lock the valve member against reversal until said locking end of the operating member has moved beyond said arcuate face, and an actuating spring connecting the opposite end of the operating member and the movable valve and tensioned by the oscillation of the operating member to shift the valve member when released by the locking end of the operating member.

2. The combination with fluid pressure operated pulsator mechanism, of a movable control valve governing the action of the fluid pressure upon said mechanism, an actuating spring placed under tension by the action of the mechanism to alternate the control valve, an oscillatory locking member actuated by said mechanism, two arcuate faces upon the valve member alternately positioned concentric with the pivotal point of the oscillatory locking member by the alternation of the control valve, said locking member engaging the concentrically positioned arcuate face to prevent the reversal of the valve until said locking member has been moved beyond the range of such arcuate face by the action of the mechanism.

3. The combination with fluid pressure operated pulsator mechanism of a movable control valve controlling the action of the fluid pressure upon said mechanism, a constantly moving locking member therefor actuated by the pulsator mechanism, said valve and locking member moving in intersecting paths of travel, one of said members being indented to agree with the path of travel of the other member, and means energized by the action of the pulsator mechanism for shifting said valve upon the disengagement of the locking member therefrom.

4. The combination with fluid operated pulsator mechanism, of a movable control valve governing the action of the fluid pressure upon said mechanism, an operating member actuated by the said mechanism and moving in a plane parallel with that of the valve member, the paths of travel of the valve member and the operating member intersecting whereby the movement of the valve is prevented until the operating member is withdrawn from its path of travel, and means energized by the action of the said mechanism for shifting the valve.

5. In a construction of the character described, a pivoted valve member, a pivoted control member, said valve member and control member being mounted to oscillate in parallel planes and intersecting paths of travel, said valve member being normally held against movement by said control member, an actuating spring placed under tension by the movement of the control member, and means for oscillating the control member.

6. In a construction of the character described, an oscillatory control member, a movable valve member having thereon two arcuate marginal faces alternately positioned concentric with the center of oscillation of the control member by the movement of the valve, said control member being adapted to oscillate within such concentric arcuate face and to prevent the movement of the valve until withdrawn therefrom, and actuating means for the valve energized by the movement of the control member.

7. In a construction of the character described, an oscillatory valve member, an oscillatory control member operating in a plane common with that of the oscillatory valve and an actuating spring for the valve, the control member being adapted to simultaneously lock the valve member and tension the spring to actuate the valve member when released by the control member, and means to actuate the control member.

8. In a construction of the character described, an oscillatory valve member, and an oscillatory control member therefor, pivoted in spaced relation and independently movable to and fro past dead center positions in relation with their pivotal points, a spring connecting the mean end of one member with the extreme end of the other member, said control member being adapted to simultaneously lock the valve member against movement and tension said spring to actuate the valve member when released by said control member, and means to actuate the control member.

9. In a construction of the character described, an oscillatory valve member, a medially pivoted oscillatory control member having one end normally extending into the path of travel of the valve member and holding said valve member against movement, and a spring connecting the opposite arm of the control member and valve member and placed under tension by the movement of the control member to a position out of the path of the valve member.

10. In a construction of the character described, an oscillatory control member, a valve member having therein two arcuate indentations alternately brought to positions registering with the path of travel of the control member by the alternation of the valve, means for oscillating the control member within the registered indentation, and an actuating spring tensioned by the oscillation of the control member adapted to shift the valve upon the movement of the control member beyond such indentation.

11. In a snap over mechanism of the character described, the combination with a body having therein a pair of ports to be alternately opened and closed, of a port governing lever and a control lever pivoted in spaced relation and independently movable to and fro past dead center positions in relation with their respective pivotal points, the mean ends of said levers oscillating in intersecting paths of travel, and a spring connecting the mean end of the port governing lever and the extreme end of the control lever, said spring being tensioned by the movement of the control lever to subsequently actuate the port governing lever, and means controlled by the opening and closing of the ports for oscillating the control lever.

12. In a snap over mechanism of the character described, the combination with a body having therein a pair of ports to be alternately opened and closed, of a port governing lever and a control lever pivoted in spaced relation and independently movable to and fro past dead center positions in relation with their respective pivotal points, a spring operatively connecting the levers one with the other, and tensioned by the oscillation of one of the levers to actuate the other lever in the same direction and means controlled by the opening and closing of the ports for actuating one of the levers.

13. The combination with fluid pressure operated pulsator mechanism, of a movable control valve governing the action of the fluid pressure upon said mechanism, a movable control member actuated by said mechanism, said members being movable through intersecting paths of travel, one of the members having therein two indentations alternately brought to position to permit the passage of the other member, and a spring tensioned by the operation of said mechanism to actuate the valve member when permitted to so do by the movement of the control member.

14. The combination with fluid pressure operated pulsator mechanism, of an oscillatory member governing the action of the fluid under pressure, and a second pivoted member actuated by the fluid under pressure, said members oscillating in a substantially common plane in intersecting paths of travel, a spring by which the first mentioned member is oscillated when the second member has been moved beyond its path of oscillation and extensions on the first member engaging with the second member to limit its degree of oscillation, substantially as specified.

15. In a snap over mechanism of the character described, the combination with a body having therein ports to be alternately opened and closed, of a port governing lever, and a control lever independently movable to and fro in intersecting paths of travel, a spring connecting the mean end of one lever with the extreme end of the other lever, and tensioned by the movement of the control lever to subsequently actuate the port governing lever, and means controlled by the opening and closing of the ports for actuating the control lever.

16. In a snap over mechanism of the character described, the combination with a body having therein ports to be alternately opened and closed, of a port governing lever, and a control lever independently movable to and fro in intersecting paths of travel, and a spring having one end connected to one lever and the other end connected to the other lever and placed under tension by the oscillation of the control lever to subsequently move the port governing lever clock wise or counter clock wise according to like movement of the control lever.

In testimony whereof, I have hereunto set my hand this 23rd day of November A. D. 1918.

JOHN A. SCHMITT.

Witnesses:
H. J. Ossing,
John G. G. Eklundh.